(12) United States Patent
Lilly et al.

(10) Patent No.: US 11,593,506 B2
(45) Date of Patent: Feb. 28, 2023

(54) SYSTEMS AND METHODS FOR PRIVACY-ENHANCING TRANSFORMATION OF A SQL QUERY

(71) Applicant: IMMUTA, INC., College Park, MD (US)

(72) Inventors: Kyle Thomas Lilly, Alexandria, VA (US); Joseph J. Regensburger, Grove City, OH (US); Alfred V. Rossi, III, Hilliard, OH (US); Mason Sharp, Holmdel, NJ (US)

(73) Assignee: IMMUTA, INC., College Park, MD (US)

(*) Notice: Subject to any disclaimer, the term of this patent is extended or adjusted under 35 U.S.C. 154(b) by 294 days.

(21) Appl. No.: 16/891,965

(22) Filed: Jun. 3, 2020

(65) Prior Publication Data
US 2020/0380159 A1  Dec. 3, 2020

Related U.S. Application Data (60) Provisional application No. 62/856,485, filed on Jun. 3, 2019.

(51) Int. Cl.
*G06F 16/2455* (2019.01)
*G06F 21/62* (2013.01)
*G06F 16/2452* (2019.01)

(52) U.S. Cl.
CPC ...... *G06F 21/6227* (2013.01); *G06F 16/2455* (2019.01); *G06F 16/24524* (2019.01)

(58) Field of Classification Search
CPC ............ G06F 21/6227; G06F 16/2455; G06F 16/24524

USPC .................................................. 707/736, 756
See application file for complete search history.

(56) References Cited

U.S. PATENT DOCUMENTS

| | | | | |
|---|---|---|---|---|
| 8,291,509 | B2* | 10/2012 | Kerschbaum | H04L 9/3073 713/185 |
| 9,554,203 | B1* | 1/2017 | Pavlidi | H04R 1/08 |
| 9,955,277 | B1* | 4/2018 | Alexandridis | H04S 7/30 |
| 10,467,234 | B2* | 11/2019 | Nerurkar | G06F 21/6254 |
| 10,922,315 | B2* | 2/2021 | Jeong | G06F 16/24 |
| 11,055,432 | B2* | 7/2021 | Hockenbrocht | G06F 16/2358 |
| 11,068,520 | B1* | 7/2021 | Neumann | G06F 16/24534 |
| 11,163,904 | B2* | 11/2021 | Barbas | G06F 16/24564 |
| 2007/0288427 | A1* | 12/2007 | Ramer | G06F 16/951 |
| 2015/0156578 | A1* | 6/2015 | Alexandridis | H04R 3/005 381/92 |
| 2018/0247072 | A1* | 8/2018 | Hind | G06F 21/604 |
| 2018/0349384 | A1* | 12/2018 | Nerurkar | G06F 16/24578 |
| 2019/0026489 | A1* | 1/2019 | Nerurkar | G06N 20/00 |
| 2019/0138743 | A1* | 5/2019 | Nerurkar | G06F 21/6227 |
| 2019/0318121 | A1* | 10/2019 | Hockenbrocht | G06F 16/2456 |
| 2019/0362007 | A1* | 11/2019 | Jeong | G06F 16/24 |
| 2020/0074107 | A1* | 3/2020 | Barbas | G06F 16/24564 |
| 2021/0264057 | A1 | 8/2021 | Murray et al. | |
| 2021/0397733 | A1 | 12/2021 | Lilly et al. | |

* cited by examiner

*Primary Examiner* — Hanh B Thai
(74) *Attorney, Agent, or Firm* — MH2 Technology Law Group, LLP (57) ABSTRACT

Systems and methods for obtaining a SQL query, translating the SQL into a modified SQL query incorporating a privacy mechanism, and outputting the modified SQL query incorporating the privacy mechanism. In some embodiments, the modified SQL query incorporating the privacy mechanism is forwarded to a SQL database.

12 Claims, 7 Drawing Sheets

FIG. 7

SYSTEMS AND METHODS FOR PRIVACY-ENHANCING TRANSFORMATION OF A SQL QUERY

CROSS-REFERENCE TO RELATED APPLICATIONS

This application claims the benefit and filing date of U.S. Provisional Application No. 62/856,485 filed on 3 Jun. 2019, which is hereby incorporated by reference in its entirety.

BACKGROUND

The mass availability of cheap storage combined with an ever-increasing number of internet-connected devices has led to an explosion of data. It is often difficult to glean insight from data in the raw. For this reason, it is a common practice to first load the data into some kind of database system. To facilitate exploration and analysis, such systems are commonly queried using specialized formal query languages, such as ANSI SQL or similar, to enable expedient searching and distillation of data.

Frequently, datasets contain elements which pertain to individuals. Such elements may be identifying or sensitive in nature, presenting privacy concerns.

In response to these concerns, personal or sensitive data can be simply removed, redacted, or held back from the database or organizational data sources. But depending on the data, this may render the dataset less suitable, or even unusable, for various purposes that are valuable to the organization and/or to society. In other words, removing or redacting data significantly reduces its analytic value and can reduce the analytic value of the entire dataset.

A privacy mechanism is a (possibly) randomized algorithm which takes as input a database (which is generally understood to contain information regarding some individuals), and a query over that database, and outputs the response to the query. In some examples, a privacy mechanism can provide a relatively accurate response to the query while limiting the ability of an outside party to infer that the database contains information regarding any individual from the query result.

Differential privacy is a family of mathematical techniques that formally limit the amount of private information that can be inferred about each data subject. There are two main types of differential privacy, offering slightly different privacy guarantees: "global," which offers data subjects deniability of participation, and "local," which offers deniability of record content. Despite being slightly different, both operate by introducing randomization into computations on data to prevent an attacker from reasoning about its subjects with certainty. Ultimately, these techniques afford data subjects deniability while still allowing analysts to learn from the data.

Concerning ("global") differential privacy, consider a game in which an attacker is provided a pair of databases $\mathcal{D}_1$, and $\mathcal{D}_2$ that differ only by insertion (or deletion) of a single record, and the evaluation of some privacy mechanism, $\mathcal{A}$, over either $\mathcal{D}_1$ or $\mathcal{D}_2$. The attacker is allowed to examine $\mathcal{D}_1$, $\mathcal{D}_2$, and is given a full specification of the privacy mechanism $\mathcal{A}$, so that the attacker can independently evaluate $\mathcal{A}$ over $\mathcal{D}_1$, $\mathcal{D}_2$, or any input of their choosing. The goal of the attacker is to guess whether the provided evaluation is $\mathcal{A}(\mathcal{D}_1)$ or $\mathcal{A}(\mathcal{D}_2)$. This task is considered difficult if the attacker is forced to guess and, regardless of attack methodology, is unlikely to be able to correctly guess the source database significantly more than 50% of the time. Intuitively, if the attacker is unable to determine the input database from the result after being given the complete contents of $\mathcal{D}_1$, $\mathcal{D}_2$, and being permitted examination of and experimentation with $\mathcal{A}$, it must be that the result carries little information about the row in which the databases differ. Further, the privacy mechanism $\mathcal{A}$ is considered private if its construction ensures that this task is difficult over any pair of adjacent databases.

Formally, difficulty is ensured by requiring that the privacy mechanism respect a certain distributional condition with respect to its output. Specifically, a privacy mechanism, $\mathcal{A}$, is called ("globally") $\varepsilon$-differentially private, if for any pair of databases $\mathcal{D}_1$, $\mathcal{D}_2$ which differ from each other by insertion (or deletion) of a single record, and any S⊆Range($\mathcal{A}$), it holds that Pr[$\mathcal{A}(\mathcal{D}_1)\in$S]≤$e^\varepsilon$·Pr[$\mathcal{A}(\mathcal{D}_2)\in$S].

Roughly, when $\varepsilon$ is small, this condition ensures that there exists no set of outputs that provide a significant advantage in determining whether the privacy mechanism was evaluated over $\mathcal{D}_1$ and $\mathcal{D}_2$. One way to quantify the advantage conferred to an adversary hoping to discriminate $\mathcal{D}_1$ from $\mathcal{D}_2$ is as follows: Let S⊆Range($\mathcal{A}$). We think of observing the event S whenever $\mathcal{A}$ returns a value contained in S. The significance (privacy-loss) of observing the event S under the privacy mechanism $\mathcal{A}$ is:

$$\mathcal{L}^{\mathcal{A}}_{\mathcal{D}_1, \mathcal{D}_2}(S) := \ln\left(\frac{Pr[\mathcal{A}(\mathcal{D}_1) \in S]}{Pr[\mathcal{A}(\mathcal{D}_2) \in S]}\right)$$

Thus, it is desirable to provide systems and methods that enable an organization to maintain a SQL database and balance safeguards to personal privacy with the need to provide access to the data in its databases in a manner that lowers or minimizes the reduction in analytic value while also providing an appropriate level of protection to the personal or sensitive data.

BRIEF SUMMARY

Embodiments consistent with the present invention include systems and processes that obtain a SQL query, translate the SQL into a modified SQL query incorporating a privacy mechanism, and output the modified SQL query incorporating the privacy mechanism. In some embodiments, the modified SQL query incorporating the privacy mechanism is forwarded to a SQL database. In some embodiments, the systems and processes take as input a query, written in SQL, together with the schema and configuration parameters (E) for the privacy mechanism, and output a new SQL query which evaluates to the result of the input query under application of the privacy mechanism.

Various embodiments include a system that can include a computer-readable data storage device containing program instructions and an associated processor that executes the instructions to perform a process or set of operations. The operations can include obtaining a SQL query, translating the SQL into a modified SQL query incorporating a privacy mechanism, and outputting the modified SQL query incorporating the privacy mechanism. In some embodiments, the modified SQL query incorporating the privacy mechanism is forwarded to a SQL database.

Other embodiments can include a process or operations for obtaining a SQL query, translating the SQL into a modified SQL query incorporating a privacy mechanism, and outputting the modified SQL query incorporating the privacy mechanism. In some embodiments, the modified SQL query incorporating the privacy mechanism is forwarded to a SQL database.

DETAILED DESCRIPTION

One way to protect privacy in providing results to SQL queries made to a SQL database is to utilize a privacy mechanism.

In some examples, a privacy mechanism can provide a relatively useful and/or accurate response to the query while limiting the ability of an outside party to infer that the database contains information regarding any individual from the query result.

Privacy mechanisms (e.g., implementations of privacy policies) can produce the effect of reducing the precision of data (e.g., representing data such as date-of-birth as year-of-birth or generalizing zip code to state), removing sensitive data elements (e.g., removing social security numbers), or randomizing certain data elements, such as measurements, among other things. In various implementations described herein, The privacy-utility tradeoff is a central concern for the multitude of useful and beneficial analytics applications which operate with sensitive data. Favoring the privacy extreme, a dataset in a database could simply be represented as randomized entries. This assures that no private information is leaked, but such data would offer no utility for gaining insights. On the other extreme, all collected data can be utilized as is without privacy protections. The data would have maximal utility but present a significant risk of being misused, either maliciously or accidentally.

It is known to utilize privacy mechanisms or privacy policies in association with a database, but current conventional systems do so by applying such at the database, such that the users of the database have to apply the privacy algorithms, which may be complex and difficult to use.

Unlike conventional systems, various embodiments of the systems and methods described herein instead translate the query before it reaches the database to produce a modified query incorporating a privacy mechanism therein. In accordance with various embodiments, by applying the privacy mechanism via query modification, the administrators of the database do not have to be concerned with the privacy aspects of the query and its results. Moreover, such systems and methods can be used to augment the capabilities of SQL databases which do not offer such features directly in product, including enforcement of the use of the privacy-mechanism, by configuring the SQL database to only accept queries from the system performing translation to embed the privacy-mechanism.

Various embodiments of the systems and methods described herein are configured to function with SQL (Structured Query Language), which is a standard language for accessing and manipulating databases. Other embodiments may use other query languages and/or databases. SQL became a standard of the American National Standards Institute (ANSI) in 1986, and of the International Organization for Standardization (ISO) in 1987. A SQL query is a query written in SQL that can execute against a RDBMS (Relational Database Management System). Herein, a RDBMSs which can be queried with SQL may be referred to as SQL databases.

The data in a SQL database is stored in database objects called tables. A relation is a collection of related data entries and it consists of records and attributes. Relations are often depicted as tables, where attributes are organized into columns. For reasons of exposition, a relationship is sometimes conceptualized as a table, referring to records as "rows" and sequences of attribute values as "columns." A SQL database most often contains one or more tables. Each table may be identified by a name (e.g. "Customers" or "Orders"). The tables contain records (rows) with data.

An aggregate SQL query is a SQL query that produces summaries of grouped data. For example, consider the following dataset called Salaries:

TABLE 1

| ID | FirstName | LastName | Sex | Salary | Occupation |
|----|-----------|----------|-----|--------|------------|
| 1 | Jennifer | St John | F | $250,000 | Physician |
| 2 | Mark | McDowell | M | $57,400 | Teacher |
| 3 | Tina | Donaldson | F | $66,500 | Technician |
| 4 | Lisa | Smith | F | $48,000 | Technician |
| 5 | Tom | Robinson | M | $88,450 | Farmer |
| 6 | Brad | Stevens | M | $52,800 | Technician |

The Salaries dataset is a relation, records are the rows, attributes such as FirstName, LastName, Salary are organized along columns. Attributes like Occupation and Sex are categorical attributes, because their values "label".

In conjunction with this dataset, the SQL query: SELECT Salary, Occupation FROM Salaries WHERE FirstName='Jennifer' AND LastName='St John' could return the following result set in a conventional scenario:

| Salary | Occupation |
|--------|------------|
| $250,000 | Physician |

This is not an aggregate query, since it does not summarize multiple rows. On the other hand, the SQL aggregate query SELECT Sex, AVG(Salary) FROM Salaries GROUP BY Sex could return the following results in a conventional scenario:

| Sex | Salary |
|-----|--------|
| F | $121,500 |
| M | $66,216.66 |

Figure 1:
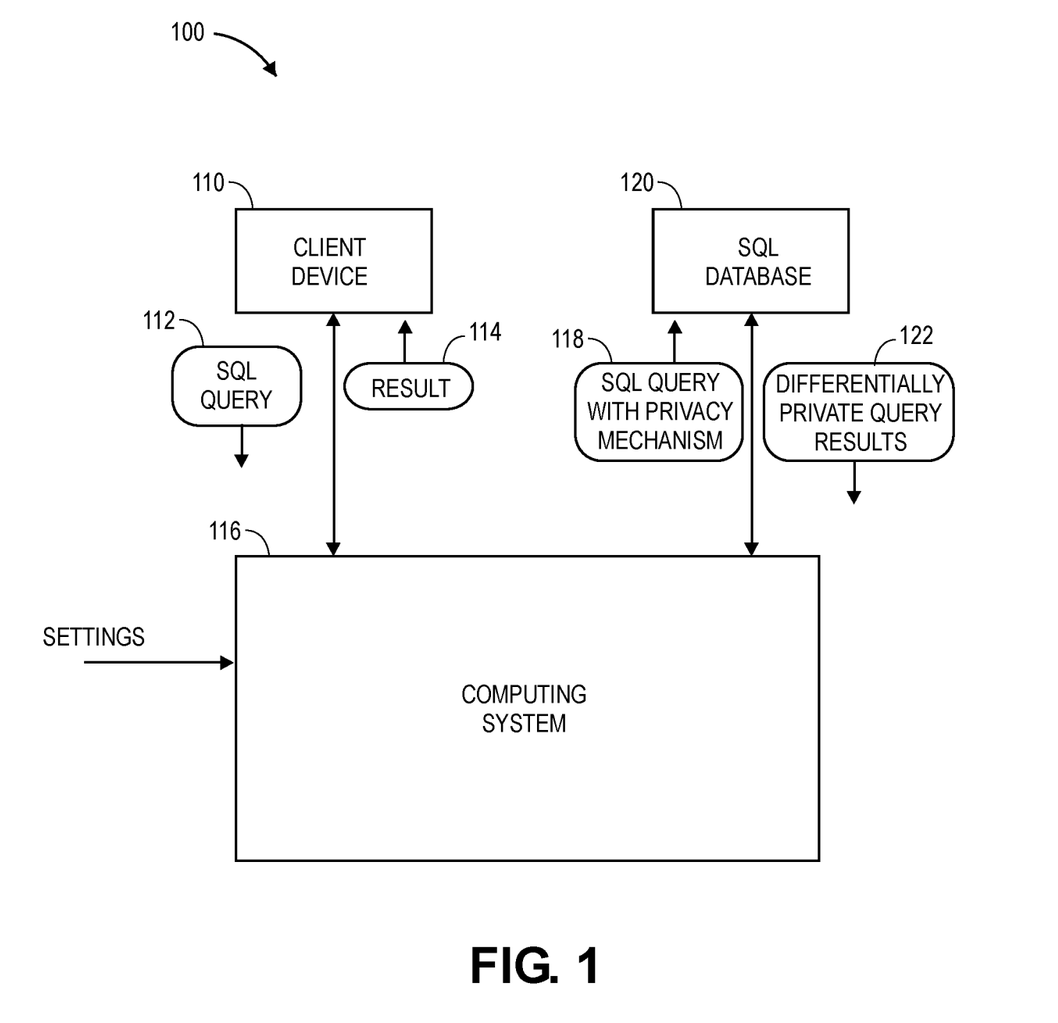
FIG. 1 illustrates a block diagram of an example of an environment for implementing systems and methods in accordance with aspects of the present disclosure.

FIG. 1 illustrates a block diagram of an example of a system or an environment 100 for implementing systems and methods in accordance with aspects of the present disclosure. The environment 100 may include a client device 110, a computing system 116, and a SQL database 120.

In one usage example, a user may use the client device 110 to send a SQL query 112 (e.g., a request for data from a database) to the computing system 116, which provides a result 114. Computing system 116, in accordance with aspects of the present disclosure, modifies the SQL query 112 in to incorporate a privacy mechanism, producing a modified SQL query incorporating the privacy mechanism 118.

The modified SQL query 118 is forwarded to SQL database 120. The SQL database 120 evaluates the modified SQL query 118 to data in the database, and returns a result to computing system 116, which in some examples may be a differentially-private query result 122, as further described herein. The differentially-private query result 122 may be forwarded to client device 110 as result 114. The computing system 116 may be configured to receive settings to control application of the privacy mechanism to produce the modified SQL query.

In some examples, the computing system 116 is configured to modify the SQL query 112 to produce the modified SQL query incorporating the privacy mechanism present in 118. In some examples, the computing system 116 may be unknown or transparent to a user operating the client device 110. For example, the SQL database 120 may be configured to route some or all incoming SQL queries to the computing system 116 for application of the privacy mechanism to the SQL queries. Alternatively, the computing system 116 may be configured with a SQL receiving address for the SQL database 120 so that SQL queries are directed to the computing system 116.

In various embodiments, the client device 110 can be an input/output device or computing device that is communicatively connected (directly or indirectly) to the computing system 116 via one or more communication channels. In some implementations, the client device 110 can be a terminal of the computing system 116 or a personal computing device or the like that provides a user interface. For example, the client device 110 may provide a user 105 with a graphic user interface via which the user can send the SQL query 112 to the computing system 116, and receive results 114. The communication channel can comprise a wired or wireless data link and/or communication networks, such as a data bus, a local area network, a wide area network, or the Internet.

As noted previously as a usage example, a user may use the client device 110 to send a SQL query 112 (e.g., a request for data from a SQL database) to the computing system 116. The user can only access or see the resulting requested data after the data has been obscured according to the privacy mechanism in the modified SQL query 118, which may be applicable to some of the users of the client device 110, but not to others, which can be specified, for example, in the settings input to the computing device 116, as further explained herein.

In various embodiments, the computing system 116 includes hardware and software that perform the processes, services, operations, and functions described herein. In some embodiments, the computing system 116 can be implemented as a server.

In various embodiments, the SQL database(s) 120 can be any type of information repository that is queryable. In some implementations, the SQL database 120 can be one or more queryable database, which may be columnated or columnar. In some implementations, the database 120 can be or include data structures, such as PYTHON'S PANDAS DATAFRAME™ or R DATAFRAMES™, and/or can be or include data structures for common consumer applications, such as MICROSOFT EXCEL™ worksheets or MICROSOFT ACCESS™ databases, as are known to those of skill in the art.

In various implementations, the SQL database 120 can contain Personally Identifiable Information (PII) or other sensitive data. In one use case example, the database 120 can be a collection of information (e.g., a dataset) maintained by a healthcare provider, and can contain medical, personal, and other sensitive information regarding patients, caregivers and insurers. In other use cases, the database 120 can contain human resources data, business data, financial data (e.g., trade or transactional data), insurance data, etc.

While the SQL database 120 is illustrated as being remote from the computing system 116 in the example shown in FIG. 1, it is understood that some or all of the SQL database 120 could be part of or implemented by the computing system 116 and/or maintained by one or more entities different from the entity that provides, operates, or maintains the computing system 116.

One of ordinary skill will recognize that the components, arrangement, and implementation details of the system 100 are examples presented for conciseness and clarity of explanation. Other components, implementation details, and variations may be used, including adding, combining, or subtracting components. For example, there may be two or more SQL databases 120, some or all of which are external to the computing system 116.

Figure 2:
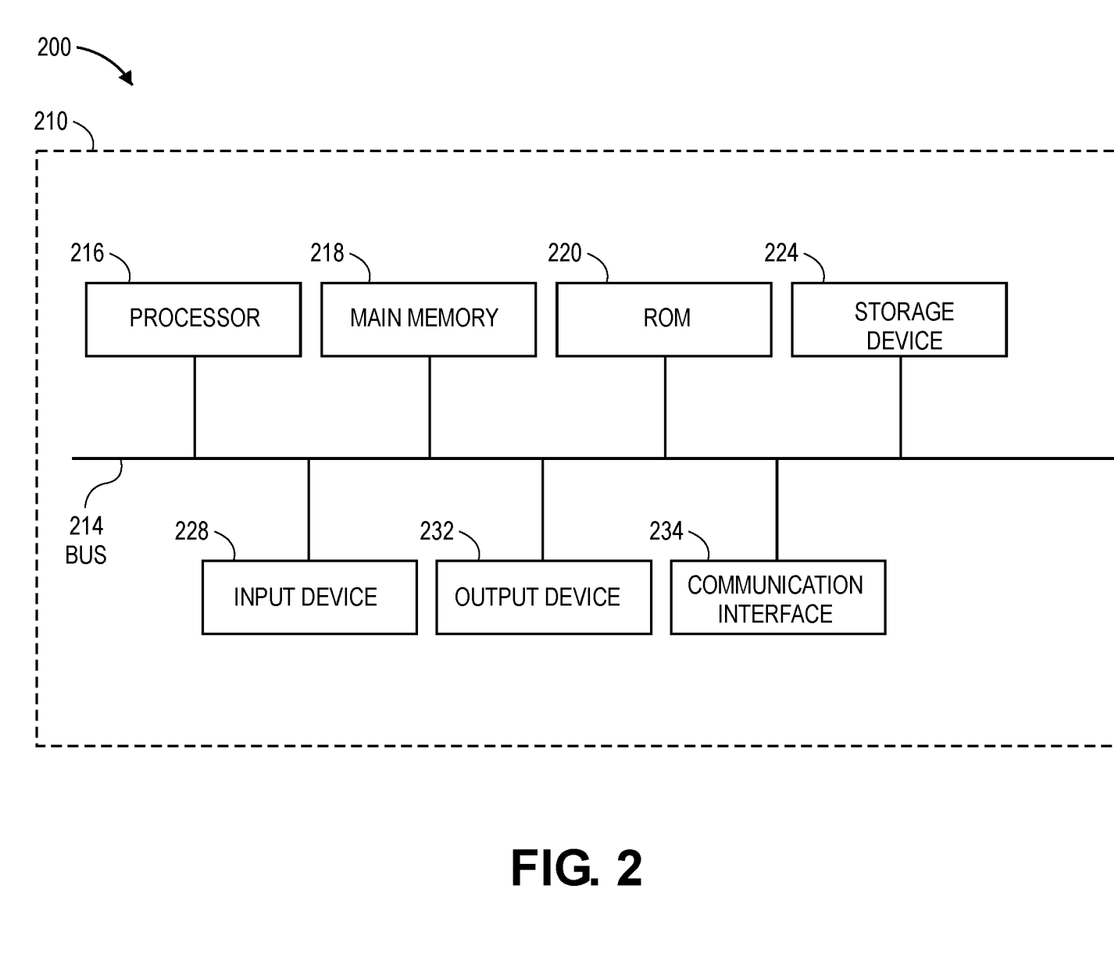
FIG. 2 shows a system block diagram illustrating an example of a computing system, in accordance with aspects of the present disclosure.

FIG. 2 shows a system block diagram illustrating an example of further details of the computing system 116 of FIG. 1, illustrated as computing system 200, in accordance with aspects of the present disclosure. As shown in this example, the computing system 200 includes a computing device 210 capable of communicating via a network, such as the Internet. In example embodiments, the computing device 210 may correspond to a mobile communications device (e.g., a smart phone or a personal digital assistant (PDA)), a portable computer device (e.g., a laptop or a tablet computer), a desktop computing device, a server, etc. In some embodiments, the computing device 210 may host programming and/or an application to carry out the translating of the SQL query functions as described herein. The computing device 210 is configured to receive and/or obtain the SQL query over communications interface 234, for example.

The computing device 210 may include a bus 214, a processor 216, a main memory 218, a read only memory (ROM) 220, a storage device 224, an input device 228, an output device 232, and a communication interface 234.

Bus 214 may include a path that permits communication among the components of device 210. Processor 216 may be or include a processor, a microprocessor, an application specific integrated circuit (ASIC), a field programmable gate array (FPGA), or another type of processor that interprets and executes instructions. Main memory 218 may include a random access memory (RAM) or another type of dynamic storage device that stores information or instructions for execution by processor 216. ROM 220 may include a ROM device or another type of static storage device that stores static information or instructions for use by processor 216. Storage device 224 may include a magnetic storage medium, such as a hard disk drive, or a removable memory, such as a flash memory.

Input device 228 may include a component that permits an operator to input information to device 210, such as a control button, a keyboard, a keypad, or another type of input device. Output device 232 may include a component that outputs information to the operator, such as a light emitting diode (LED), a display, or another type of output device. Communication interface 234 may include any transceiver-like component that enables device 210 to communicate with other devices or networks. In some implementations, communication interface 234 may include a wireless interface, a wired interface, or a combination of a wireless interface and a wired interface. In embodiments, communication interface 234 may receive computer readable program instructions from a network and may forward the computer readable program instructions for storage in a computer readable storage medium (e.g., storage device 224).

System 200 may perform certain operations, as described in detail below. System 200 may perform these operations in response to processor 216 executing software instructions contained in a computer-readable medium, such as main memory 218. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 218 from another computer-readable medium, such as storage device 224, or from another device via communication interface 234. The software instructions contained in main memory 218 may direct processor 216 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, system 200 may include additional components, fewer components, different components, or differently arranged components than are shown in FIG. 2.

The system may be connected to a communications network (not shown), which may include one or more wired and/or wireless networks. For example, the network may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the communications network may include copper transmission cables, optical transmission fibers, wireless transmission, routers, firewalls, switches, gateway computers and/or edge servers.

The computing device 210 shown in FIG. 2 may be configured to receive or obtain a SQL query and to translate the SQL query into a modified SQL query incorporating a privacy mechanism. In some examples, the computing device 210 may be configured to send the modified SQL query incorporating the privacy mechanism to a SQL database and receive a result of the modified SQL query from the SQL database. In some examples, the privacy mechanism is configured so that the result of the modified SQL query produces a result with differential privacy, e.g., a result that includes a specific amount or minimum of differential privacy (e.g., noise), as further described herein.

One of ordinary skill will recognize that the components, arrangement, and implementation details of the computing system 116, 210 are examples presented for conciseness and clarity of explanation. Other components, implementation details, and variations may be used, including adding, combining, or subtracting components and functions.

Figure 3:
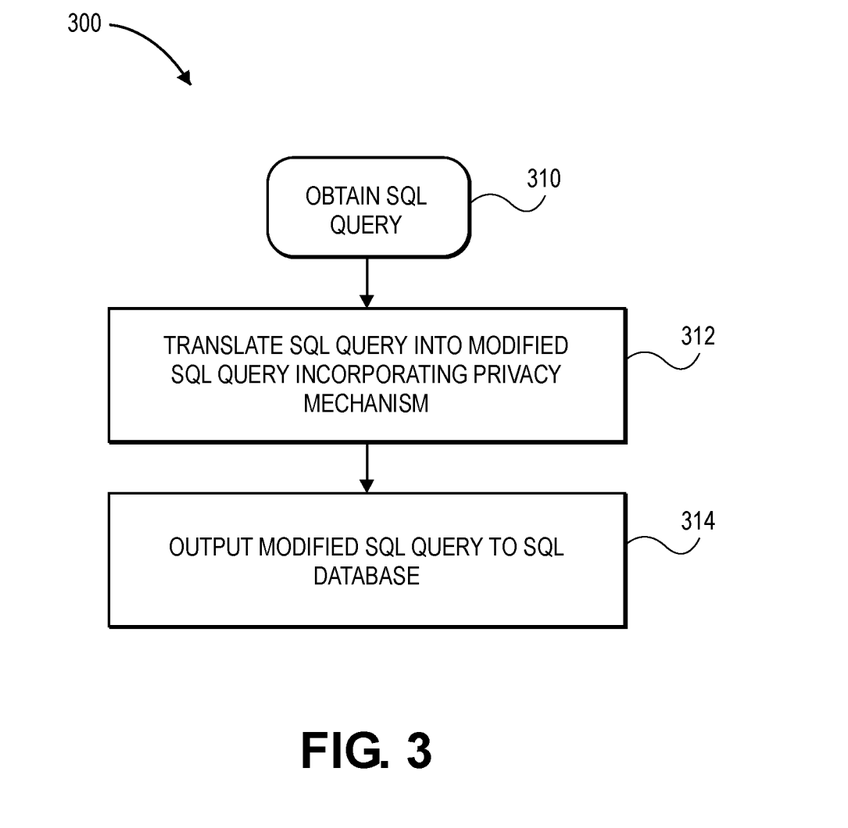
FIG. 3 is a flowchart of an example of a process for translating a SQL query into a SQL query incorporating a privacy mechanism, in accordance with aspects of the present disclosure.

FIG. 3 shows an example of processes for translating a SQL query into a modified SQL query having a privacy mechanism incorporated therein. In the example shown, at block 310, the computing system 116, 210 obtains or receives a SQL query 112. The SQL query 112 may be obtained or received over communications interface 234, for example.

In block 312, the computing system 116, 210 translates the SQL query 112 into a modified SQL query incorporating a privacy mechanism 118. Examples of further details of the translating of the SQL query is further described herein.

In block 314, the modified SQL query 118 incorporating the privacy mechanism is output by the computing system 116, 210. The computing system 116, 210 may output the modified SQL query 118 using the communication interface 234, for example. In some examples, the modified SQL query 118 is output to a SQL database 120.

Figure 4:
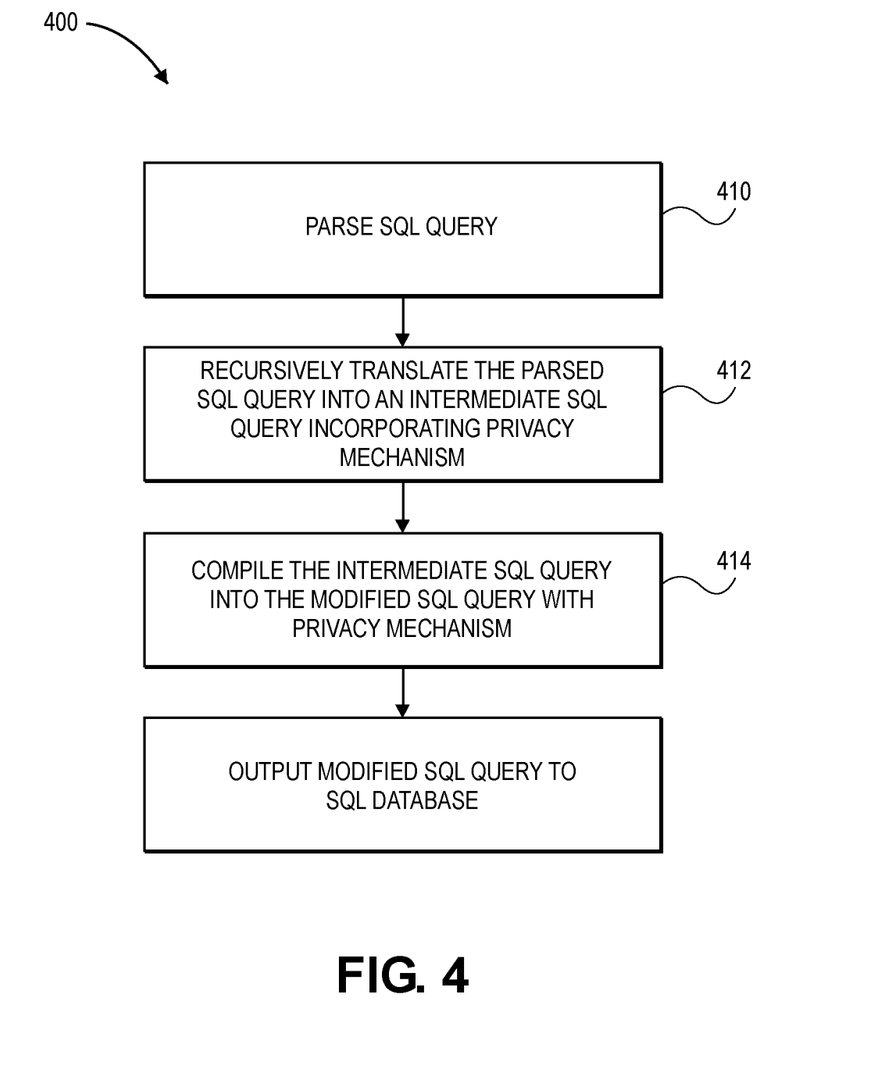
FIG. 4 is a flowchart of an example of a process for translating a SQL query in accordance with aspects of the present disclosure.

FIG. 4 shows an example of a process for translating a SQL query into a modified SQL query having a privacy mechanism incorporated therein. In the example shown, at block 410, the computing system 116, 210 parses the SQL query 118.

At block 412, the computing system 116, 210 recursively translates the parsed SQL query into an intermediate SQL query incorporating the privacy mechanism. Details of recursively translating the parsed SQL query into an intermediate SQL query incorporating the privacy mechanism are further described herein.

At block 414, the computing system 116, 210 compiles the intermediate SQL query into the modified SQL query incorporating the privacy mechanism. Details of the compiling are further described herein.

At block 416, the computing system 116, 210 outputs the modified SQL query incorporating the privacy mechanism. In some examples, the modified SQL query incorporating the privacy mechanism may be output to a SQL database 120.

In some implementations, in a relational database table (relation), records (rows) are finite-length tuples of values where each column entry (attribute) takes values in some domain. Some of the embodiments described herein are applicable to domains which are either finite sets whose values represent categorical labels (categorical domains), or the set of all real numbers (numerical domains).

In some example implementations, the processes and methods can initially partition the values for a queried set of attributes into distinct groups of neighboring values. This can be implemented and/or seen as defining a histogram or a count table of attribute values over k distinct groups. This may be understood in the context of working towards the general case. To begin, consider the case of a single numerical attribute, which may be described as follows: Let k≥2. A k-bin binning scheme is a vector $\vec{b} \in \mathbb{R}^{k-1}$ with increasing entries that is used to induce a partition of numerical values. Any numerical value v is said to fall in bins 1 through k with respect to a k-bin binning scheme $\vec{b}$. It is further said that v falls in to bin 1 if $v < \vec{b}_1$, bin j if $j<k$ and $\vec{b}_1 \leq v < \vec{b}_{j+1}$, and bin k, otherwise. In this description binning schemes, such as $\vec{b}$, may be thought of as a mathematical function which assigns each real number to a bin 1 through k. That is, $\vec{b}(v)=j$ would denote that v falls into the j-th bin under the binning scheme induced by b.

For example, assume that the salary column in Table 1 is to be binned. Further, assume that k=4 bins are desired, then b is a vector with k−1=3 entries. For example, b=(50000, 100000, 150000) then this describes 4 bins: Bin 1 which contains any salary value less than b1=50,000, Bin 2 which contains salary values between b1=50,000 and b2=100,000, Bin 3 which contains salary values between 100,000 and 150,000 (between b2 and b3); and Bin 4 which contains salary values of 150,000 or more. This example also treats b as a function to classify values, so b(400)=1 since the number 400 falls in the first bucket.

A categorical domain is the set of all possible values for a categorical variable. Consider G as the categorical domain for the occupation column is the set of all valid occupations. They may not need to actually appear in the database. For example, "Assembly Line Worker" is a valid value for a record, so "Assembly Line Worker" is in the categorical domain from which the occupation column takes values. Given G as the categorical domain, let g denote the cardinality of G. In this example, the binning scheme associated to a categorical domain G is considered to be G, itself.

For example, the above Table 1 can be simultaneously binned by Occupation and Salary to the nearest 100 k, up to 300 k. This induces a multidimensional binning with bins corresponding to any possible valid Occupation, including those that are valid but not represented in the table. This binning would include the bin labels (Physician, 0), (Physician, 1), (Physician, 2), (Physician, 3) which would label bins that count the number of doctors making 0 k, 100 k, 200 k, and 300 k or more in Salary, respectively. There are also bins (Childcare Worker, 0), (Childcare Worker, 1), (Childcare Worker, 2), (Childcare Worker, 3), assuming "Childcare Worker" is in the categorical domain (i.e., valid for the column).

Various embodiments may simultaneously bin with respect to all attributes. Let $R(A_1, A_2, \ldots, A_d)$ be a d-dimensional relation (table) comprised of m categorical attributes (columns) and n=d−m numerical attributes. In this example, without loss of generality, it is assumed that the domains of the first m attributes (R. $A_1, \ldots,$ R. $A_m$) take values in categorical domains $G_1, \ldots, G_m$, respectively, and the remaining d−m attributes (R. $A_{m+1}, \ldots,$ R. $A_d$) are numerical domains corresponding to $P_1, \ldots, P_n$. Continuing this example, if 1≤i≤n, let $\vec{b}^{(i)}$ denote a $k_i$-bin binning scheme for $P_i$. Further, under this example, the system may bin any tuple (row) r ∈ R with respect to the binning schemes associated to each attribute, A. This induces a row binning scheme $$B := B^{(G_1, \ldots, G_m, \vec{b}^{(1)}, \ldots, \vec{b}^{(n)})}$$

on R, which associates to each r∈R a bin label $$B(r) = (r \cdot A_1, \ldots, r \cdot A_m, \vec{b}^{(1)}(r \cdot A_{m+1}), \ldots, \vec{b}^{(n)}(r \cdot A_d)).$$

That is, the bin "label" is a point in the label space $G_1 \times G_2 \times \ldots \times G_m \times [k_1] \times [k_2] \times \ldots \times [k_n]$, denoted $\mathcal{L}(B)$. Here, for each 1≤i≤n, $[k_i]$ for denotes the set of counting numbers $\{1, \ldots, k_i\}$.

To define a histogram as associating a count to the binning label, let S be a multi-set of tuples from a d-dimensional relation, R. The histogram of S with respect to a row binning scheme, B, denoted $\mathcal{H}_S^{(B)}$, is a mathematical function from $\mathcal{L}(B)$ to the set of real numbers, where for any $\vec{\ell} \in \mathcal{L}(B)$, $\mathcal{H}_S^{(B)}(\vec{\ell})$ counts the number of items of S which are assigned to bin $\vec{\ell}$ by B.

Adding or removing any record from the dataset changes the histogram by no more than the number of columns. This establishes that the histogram has a mathematical property called bounded $\ell_1$-sensitivity, which roughly says it can only change "so much" if records are added or removed. Under this example, it follows immediately that the $\ell_1$-sensitivity of $\mathcal{H}_S^{(B)}$ is d. Thus, it follows from the protocol for ε-differentially private histogram release that a bin-wise evaluation of $\mathcal{H}_S^{(B)}$ can be made ε-differentially private, provided that each cell is perturbed by an independent sample from Lap(d/ε). In what follows, for the remainder of the example, we denote such a release as $\mathcal{H}_S^{DP,(B,\epsilon)}(\vec{\ell})$.

In this example, and some embodiments, estimates of supported aggregates are simultaneously computed from $\mathcal{H}_S^{DP,(B,\epsilon)}(\vec{\ell})$. Since ε-differentially private results are closed under post-processing, and since it is possible to simultaneously estimate supported aggregates from $\mathcal{H}_S^{DP,(B,\epsilon)}(\vec{\ell})$, the results of this example remain ε-differentially private. If noise is applied by the system 116 that results in differential privacy, then anything computed from the noisy object will also be differentially-private.

In some example embodiments, the SQL query is modified to incorporate a privacy mechanism. Conceptually, and for implementation in software or the like, the transformation can be viewed has having two parts: One part that simulates the evaluation of $\mathcal{H}_S^{DP,(B,\epsilon)}(\vec{\ell})$, and another that adjusts the query to replace expressions with alternate expressions that estimate values from the evaluation. In various embodiments, a SQL query is transformed into a SQL query that instead of being evaluated directly over the database, it is instead computed from the noisy histogram.

In various implementations, the systems and processes may initialize the system in Phase 1 by obtaining a SQL query. In various implementations, the systems and processes may also initialize the system with a database schema and configuration parameters.

In some of the embodiments, the system and processes can then parse the SQL query to produce a parse tree in Phase 2. In some embodiments, the system and processes can then, in Phase 3 include recursively translating the parse tree, replacing standard SQL aggregates with references to results from a (to-be-determined) subquery, Q.

In some embodiments, the system and processes can include the steps of Phase 3.1 of ensuring the current node of the tree is a SELECT statement, S, and beginning iterating over each range (relation or query) in S to build an associative map. In some examples, for each item in the iteration, the following steps may be performed:

1. Aborting if the item range is neither a subquery nor a table.
2. Adding an entry to the associative map, which associates the range identifier to the range.
3. If the range is a subquery, recurse.

In some embodiments, the system and processes can include the steps of Phase 3.2 of building a set of protected attributes, P. In some such embodiments, P=ø and processing proceeds by iterating over the target list of S. Describing such an embodiment further, processing continues for each target by recursively walking its parse tree. In such examples, upon encounter of a protected attribute, A, the following steps are performed:
1. Ensuring that A appears as an argument to a supported SQL aggregate, Agg. That is, the subtree encodes Agg(A) for some Agg∈$\mathcal{A}$.
2. Replacing the subtree for Agg (A) with a place-holder for an attribute reference to a subquery attribute Q.Agg(A). If aliased, adopt the specified alias, otherwise alias to Agg (A). For ease of continued exposition, we will refer to such references, Q.Agg(A), as private aggregates. Adding A to P.

In some embodiments, Phase 4 includes the following: if a parse tree contains a WHERE-clause, it is detached and saved as W. Similarly, if the parse tree contains a GROUP BY-clause, it is detached and saved as G. Such embodiments then include generating and attaching the subquery Q which computes group-wise aggregate estimates from a differentially private histogram release.

In some embodiments, Phase 4.1 includes generating a Histogram Query. Such embodiments generate a histogram query, $Q_{hist}$, producing an d=(n+m)-dimensional histogram, where n=|P| denotes the number of distinct private aggregates referenced by S (excluding those referenced by subqueries), and m=|G| is the number of GROUP BY attributes. These embodiments include the following steps:
3. Construction of Histogram Bins and Case Statements for P. For example, techniques can iterate over P. In some examples, $A_i$ can denote the element of P encountered in the i-th step of the iteration. Simultaneously, techniques can build a case statement $C_i$ which evaluates to j whenever the value of $A_i$ falls inside of the j-th bin in the binning scheme for $A_i$. In these examples, let $k_i$ denote the number of histogram bins specified in the binning scheme for $A_i$. Techniques can include constructing a query, $Q_P(\{A_i\}_{i=1}^n)$, that evaluates to a $(k_1 \times k_2 \times \ldots \times k_n)$-row result which enumerates possible combinations of histogram bin indices for $A_1, \ldots, A_n$.
4. Construction of Generating Query for Histogram Bins for Groups-By Groups. If G is defined, techniques can iterate over G. For example, let $G_i$ denote the group by attribute encountered in the i-th step of the iteration. Also, let $g_i$ denote the number of distinct entries in column $G_i$. In these embodiments, techniques can construct a query, $Q_G(\{G_i\}_{i=1}^m)$, that evaluates to a $(g_1 \times g_2 \times \ldots \times g_m)$-row result which enumerates all possible distinct groupings.
5. Construction of a Generating Query for all Histogram Bins. For example, techniques can include generating a query, $Q_B(\{C_i\}_{i=1}^n, \{G_i\}_{i=1}^m, \{l_i, m_i, h_i\}_{i=1}^n)$ over the cross-join of $Q_P$ and $Q_G$. In the event that $Q_G$ is undefined, the query can be taken over $Q_P$ only, and the result is $Q_B = Q_B(\{C_i\}_{i=1}^n, \{l_i, m_i, h_i\}_{i=1}^n)$. For each private attribute $A_i \in P$, techniques can include in $Q_B$ attributes $l_i, m_i, h_i$ that specify low, mid and high values (respectively), of the histogram bin specified by the value in column i of $Q_P$.

Note that $\{G_i\}_{i=1}^n$ may be left present in the specification, and it follows the convention that $\{G_i\}_{i=1}^0$ contributes no entries to any tuple.

In some embodiments, Phase 4.2 includes constructing a filtered histogram query. Such implementations generate a query, $Q_C(\{C_i\}_{i=1}^n, \{G_i\}_{i=1}^m, \text{Count}(*) \text{ as N})$, which selects the count of records in T, grouped over $(\{C_i\}_{i=1}^n, \{G_i\}_{i=1}^m)$. If defined, the where clause W is appended to $Q_C$, to obtained filtered counts. In these embodiments, techniques generate a query, $Q_{hist}(Q_B.*, \text{Coalesce}(Q_C.N, 0))$, over the left-join of $Q_B$ and $Q_C$ on $(\{C_i\}_{i=1}^n, \{G_i\}_{i=1}^m)$.

In various implementations, Phase 4.3 can include adding noise. In some examples, this adds Laplace noise to $Q_{hist}$. Sampling can be achieved via inverse transform sampling. For example, let $\varepsilon\_0 = \text{"min"}\{\varepsilon(A): A \in P\}$. Techniques can include preparing a query:

$Q_{noise}(\{C_i\}_{i=1}^n, \{G_i\}_{i=1}^m, \{l_i, m_i, h_i\}_{i=1}^n, \eta(N) \text{as N})$ over $Q_{hist}$, where $$\eta(N) = N + \frac{\Delta}{\varepsilon_0} \text{Sign}(\text{Random}(\ ) - 0.5) \cdot \text{Ln}(\text{Random}(\ )),$$

and where $\Delta$ is the $\ell_1$-sensitivity and is either d, or d+1, depending on which method is used to compute estimate COUNT aggregations.

In some embodiments, Phase 5 can include computing differentially private aggregations. This can construct a query $Q(\{G_i\}_{i=1}^m, \{\text{Agg}(A)\}_{A \in P})$ which contains values for all supported aggregates on each private attribute from the noisy histogram generated by $Q_{noise}$ (grouped by G).

The protocol for differentially private histogram release assumes that the bins of a histogram are disjoint. In some implementations, this is critical for the security of the protocol, since overlapping counts can be used to "average out" the noise. Even in the case where the multiple histograms are not made public, it is possible that internal algebraic manipulation involving overlapping counting queries could have noise canceling effects. In some embodiments, techniques can ensure consistent access to the noisy histogram counts of $Q_{noise}$. Thus, to ensure consistent access to the noisy histogram counts, techniques can wrap and reference the aggregate calculations in CTE over the noisy histogram query.

In some examples, if G is empty, the semantics of empty GROUP BY apply. Namely, the query Q: $=Q(\{\text{Agg}(A)\}_{A \in P})$ can be constructed such that its results are consistent with GROUP BY true. In other words, Q can behave as if all rows belong to a single group.

In some embodiments, Phase 5.1 can include counting aggregates that are computed by summing histogram bin counts. An optional alternative is supported wherein the count is obtained from direct evaluation of COUNT aggregation plus a random noise drawn from the Laplace distribution. Use of the alternative method results in an effective $\ell_1$-sensitivity of d+1. Thus when using the alternative method, in some examples, all noise terms, including those used to obscure histogram bin counts, are instead drawn from $\text{Lap}((d+1)/\varepsilon)$.

In some embodiments, Phase 5.2 can include a sum of aggregates that are computed by summing all numerical histogram bin counts weighted by the location of the bin center.

In some embodiments, Phase 5.3 can include averaging aggregates that are computed from SUM and COUNT aggregates. As a result, the average can be unstable for small counts. Thus an optional stabilization measure can allow computation of AVG with a regulated count: MAX(COUNT, 1).

In some embodiments, Phase 5.4 can include a MIN and MAX that are estimated by computing running totals of histogram bin counts from above for MAX, and below for MIN. In some examples, the running totals can be compared to estimates of the expected amount of accumulated Laplacian noise. In various implementations, the MAX (MIN) can be considered to be in the first bin where the running total exceeds the noise estimate by 1, and the location of the upper (lower) bin edge is returned.

In some embodiments, Phase 5.5 can include statistical measures of variability such as VAR_SAMP, VAR_POP, STDDEV_SAMP, STDDEV_POP computed from a binwise sum of squared deviations from AVG, where the contribution of each bin is scaled by its count. The divisions in VAR_POP, STDDEV_POP can employ the same regulated count as used in computing AVG. In some examples, computation of VAR_SAMP, and STDDEV_SAMP, evaluate to NULL if the sample size given by the regulated count is 1.

Illustrative Example

The processes and systems of embodiments can perform some or all of the above steps, some of which are illustrated in the following example. The incoming SQL query may be:

SELECT Occupation, AVG(Salary), COUNT(*) FROM Salaries GROUP BY Occupation WHERE Sex='F'; (1)

On our example data set, Salaries, this produces the following result:

| Occupation | AVG(Salary) | COUNT |
|---|---|---|
| Physician | $250,000 | 1 |
| Technician | $57,250 | 2 |

In various embodiments, the systems and processes implement the steps of Phase 1 by loading the configuration, which includes things like attribute names and types for the source dataset, privacy parameters like how much private information leakage is tolerated, the binning we want to apply to any numeric attributes (e.g. Salary), and all possible allowed values of categorical domains (e.g., all possible allowed values of Sex and Occupation.) The text of the query is then parsed into a structured representation (parse tree) for manipulation in Phase 2. The system and methods can then include, in Phase 3, recursively translating the parse tree, replacing standard SQL aggregates with references to results from a (to-be-determined) subquery, Q.

In various embodiments, the systems and processes implement the steps of Phase 3.1 that can include ensuring the current node of the tree is a SELECT statement, S, and beginning iterating over each range (relation or query) in S to build an associative map. The steps of Phase 3.1 noted above may be carried out.

In various embodiments, the systems and processes implement the steps of Phase 3.1 that can include building a set of protected attributes, P. As the systems and methods process the parsed representation, references to table attributes are encountered. Those table attributes which are not being grouped over in the query are considered protected. The systems and methods collect references to all protected attributes that appear in the target list of the query—the comma separated list immediately following SELECT. For example, in Query 1, the target list consists of:

Occupation, AVG(Salary), COUNT(*).

Here, Salary is a protected attribute because it is not being grouped over, but Occupation is not since it is being grouped over.

When encountering a protected attribute (like Salary or ID), the systems and methods of various embodiments:

1. Ensure that the protected attribute is mentioned only inside of an aggregate function—for example, Salary appears inside an Average and ID appears inside of a Count. Generically this is denoted Agg(A), so if the expression is Avg(Salary), then Agg=Avg, and A=Salary. If this is not the case and the attribute appears outside of an aggregate, the query is not safe and so the system can abort.

2. Replace Avg(Salary) with a reference to the value from another (yet to be determined) query Q. The system represents or writes this as Q.Avg (Salary), but the important thing is that this is a reference to a value that's going to come from asking the remote database to do something else with noisy histograms and referencing that, and not an instruction to it to compute an average. Salary was encountered in a manner satisfying number 1 above by putting it into the set P.

Queries can contain subqueries. For example instead of:

SELECT . . . FROM

Salaries, a query could say:

SELECT . . . FROM (SELECT . . . FROM Salaries)

This process recurses on subqueries so that the deeper queries are protected "first".

In Phase 4, the example query contains two important subclauses:

a WHERE clause (WHERE Sex='F') and, a GROUP BY clause (GROUP BY Occupation).

These clauses need to be accounted for when the system prepares the histogram, so these clauses are temporarily saved. The system generates a base histogram query, that bins the data along each protected attribute referenced in the query, as well as by any grouped categorical fields.

For Query 1 the relevant columns are Salary, Occupation, subject to the constraint that the records have Sex='F'. The output of this stage is a query that generates a histogram like the one below assuming the binning for Salary only contains two bins, one for salaries <$150 k, and one for salaries >=$150 k.

| Salary | Occupation | # OF MATCHING RECORDS |
|---|---|---|
| <$150k | Physician | 0 |
| >=$150k | Physician | 1 |
| <$150k | Teacher | 1 |
| >=$150k | Teacher | 0 |
| <$150k | Farmer | 1 |
| >=$150k | Farmer | 0 |
| <$150k | Technician | 3 |
| >=$150k | Technician | 0 |

To help compute other aggregates, the system may also include 4 pieces of metadata corresponding to numeric protected attributes corresponding to low, high and midpoint values for the bins, as well as the bin index.

The query generates results such as:

| Salary Binning Info | | | | | N = # OF MATCHING |
|---|---|---|---|---|---|
| C_1 | l_1 | m_1 | h_1 | Occupation | RECORDS |
| 1 | $0 | $75,000 | $150,000 | Physician | 0 |
| 2 | $150,000 | $225,000 | $300,000 | Physician | 1 |
| 1 | $0 | $75,000 | $150,000 | Teacher | 1 |
| 2 | $150,000 | $225,000 | $300,000 | Teacher | 0 |
| 1 | $0 | $75,000 | $150,000 | Farmer | 1 |
| 2 | $150,000 | $225,000 | $300,000 | Farmer | 0 |
| 1 | $0 | $75,000 | $150,000 | Technician | 3 |
| 2 | $150,000 | $225,000 | $300,000 | Technician | 0 |

The steps of Phase 4.1 outlined herein builds up to a query that gives the above results. The stages 1, 2 and 3 of Phase 4.1 perform the following:
1. Builds the necessary parts of the query for the remote database. It produces a query which is a sequence of case statements that turn protected numeric values into bin indexes. Numbers falling outside of the bin range get projected to the first or last bin, depending on if they are below or above the range.

In the context of this example, it produces a case statement that essentially says that if the salary is between 0 and 150,000 then it goes in bin 1, if it's between 150,000 and 300,000 it goes in bin 2, etc. Also, the outlying values go to the outer bins. The produced query may be:

```
SELECT CASE
    WHEN Salary < 0                                      THEN 1
    WHEN Salary >= 0        AND Salary < 150000          THEN 1
    WHEN Salary >= 150000   AND Salary < 300000          THEN 2
    WHEN Salary > 300000                                 THEN 2
FROM ...
```

2. Indicates what to do with the query if there is a GROUP BY clause and what it does if there isn't one.
3. Indicates how to combine the results of bullets 1 and 2 into $Q_B$, which is most of the columns but is missing G.

In various embodiments, in Phase 4.2, a Filtered Histogram Query $Q_C$ is constructed. The Filtered Histogram Query is generated by asking the remote database to get counts of data grouped by bin numbers and categorical values, subject to any where-clauses. Because of how SQL databases work, these queries would only return rows with non-zero counts, subject to any filtering. In the case of the example, the result of running the query $Q_C$ looks like, representing the bin counts for populated bins subject to the filter constraint present in the where clause—Sex='F'.

| Salary Binning Info | | | | | |
|---|---|---|---|---|---|
| C_1 | l_1 | m_1 | h_1 | Occupation | N |
| 2 | $150,000 | $225,000 | $300,000 | Physician | 1 |
| 1 | $0 | $75,000 | $150,000 | Technician | 2 |

The mathematics of differential privacy imply that is necessary to produce query results for all possible groupings. The systems and methods of various embodiments do that by combining $Q_B$ and $Q_C$ into $Q_{hist}$, which copies the filtered values from $Q_C$ into the full binning specified by $Q_B$, filling in 0 for missing values. The result is that $Q_{hist}$ contains the true filtered counts for the full binning.

That is, the embodiments generate a query that produces the following binned counts of female records as desired:

| Salary Binning Info | | | | | |
|---|---|---|---|---|---|
| C_1 | l_1 | m_1 | h_1 | Occupation | N |
| 1 | $0 | $75,000 | $150,000 | Physician | 0 |
| 2 | $150,000 | $225,000 | $300,000 | Physician | 1 |
| 1 | $0 | $75,000 | $150,000 | Teacher | 0 |
| 2 | $150,000 | $225,000 | $300,000 | Teacher | 0 |
| 1 | $0 | $75,000 | $150,000 | Farmer | 0 |
| 2 | $150,000 | $225,000 | $300,000 | Farmer | 0 |
| 1 | $0 | $75,000 | $150,000 | Technician | 2 |
| 2 | $150,000 | $225,000 | $300,000 | Technician | 0 |

In various embodiments, in Phase 4.3, the systems and processes add noise by generating a new query $Q_{noise}$ over the previous query which adds Laplace distributed noise to the results of $Q_{hist}$. The parameters of the noise come from configuration and determine how much information an adversary can learn about the presence or absence of any individual in the source data. This Query gives noisy results like the following:

| Salary Binning Info | | | | | |
|---|---|---|---|---|---|
| C_1 | l_1 | m_1 | h_1 | Occupation | N |
| 1 | $0 | $75,000 | $150,000 | Physician | -1 |
| 2 | $150,000 | $225,000 | $300,000 | Physician | 2 |
| 1 | $0 | $75,000 | $150,000 | Teacher | 1 |
| 2 | $150,000 | $225,000 | $300,000 | Teacher | -1 |
| 1 | $0 | $75,000 | $150,000 | Farmer | -1 |
| 2 | $150,000 | $225,000 | $300,000 | Farmer | 0 |
| 1 | $0 | $75,000 | $150,000 | Technician | 2 |
| 2 | $150,000 | $225,000 | $300,000 | Technician | 1 |

In various embodiments, in Phase 5, the systems and methods are configured to compute Differentially Private Aggregations from the previous query by digesting the table above. The aggregates are computed from $Q_{noise}$. The systems and methods of the embodiments are configured to transform the query $Q_{noise}$ to produce estimates of all supported aggregates, simultaneously. The embodiments roll up $Q_{noise}$ into a table that estimates the count, sum, avg, and max aggregates for each protected numeric column and group, and then join that back to $Q_{noise}$ and roll it up again and again to get further aggregates. For example, in the first rollup the system gets the average, and in the second the system uses the average to compute the sample and population variances and standard deviations. The net result of that step is to generate an aggregate summary query Q which returns a table where rows correspond to groups and where there are columns for each supported aggregate over each protected numeric attribute. Assuming that the output is grouped by occupation, an example would be:

| Occupation | Salary | | | | | Other Protected Numerics ... | | | | | |
|---|---|---|---|---|---|---|---|---|---|---|---|
| | Countsalary | SumSalary | AvgSalary | MinSalary | MaxSalary | Count | Sum | • | • | • | • |
| Physician | 1 | 375,000 | 175 | 150,000 | 300,000 | • | | | | | • |
| Farmer | −1 | −75,000 | −75,000 | | | | • | | | | • |
| Technician | 3 | 300,000 | 100,000 | 0 | 300,000 | | • | | | | • |
| Teacher | 0 | 0 | 0 | | | | | • | • | | |

Figure 5:
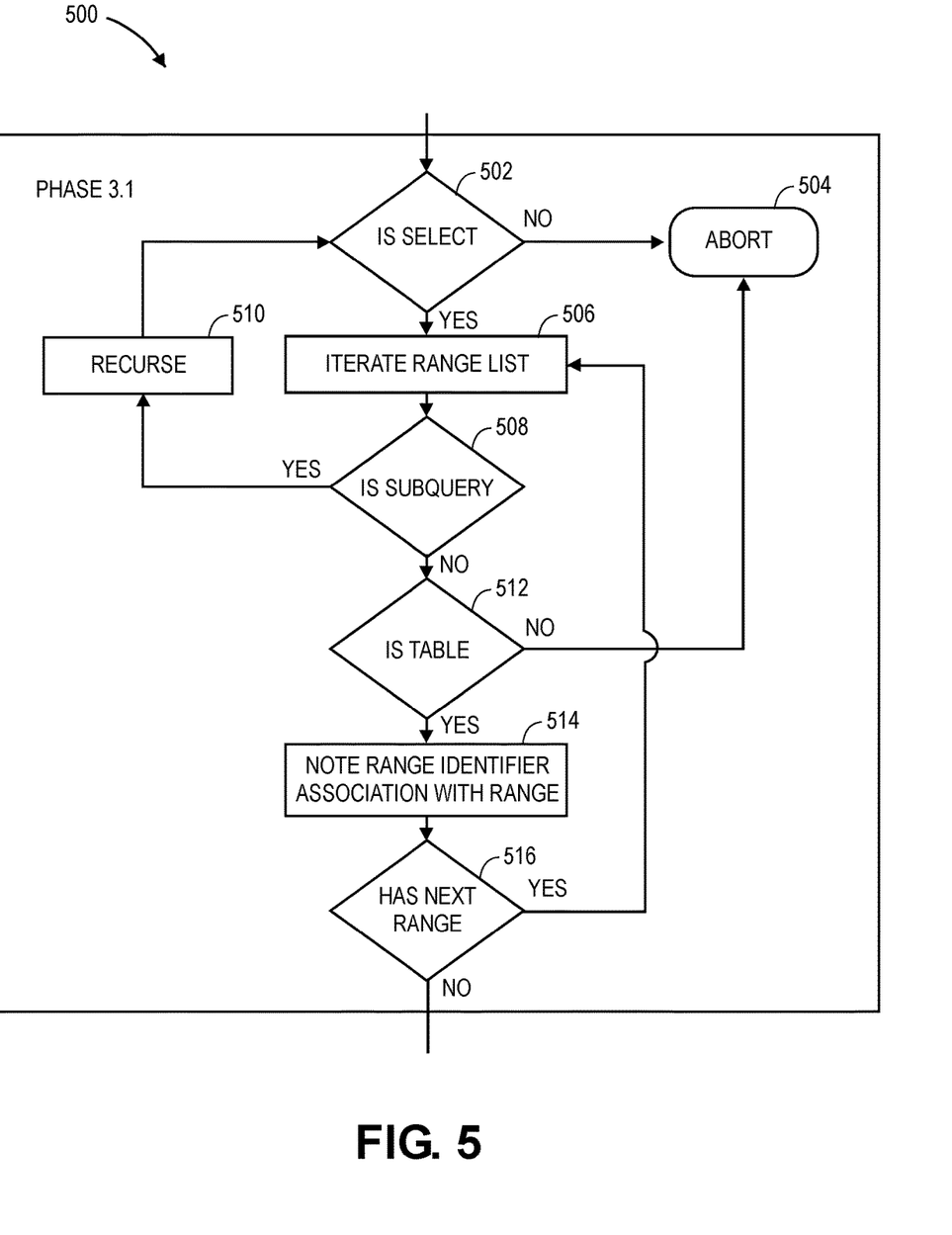
FIG. 5 is a flowchart of an example of a process of Phase 3.1 in accordance with aspects of the present disclosure.
Figure 6:
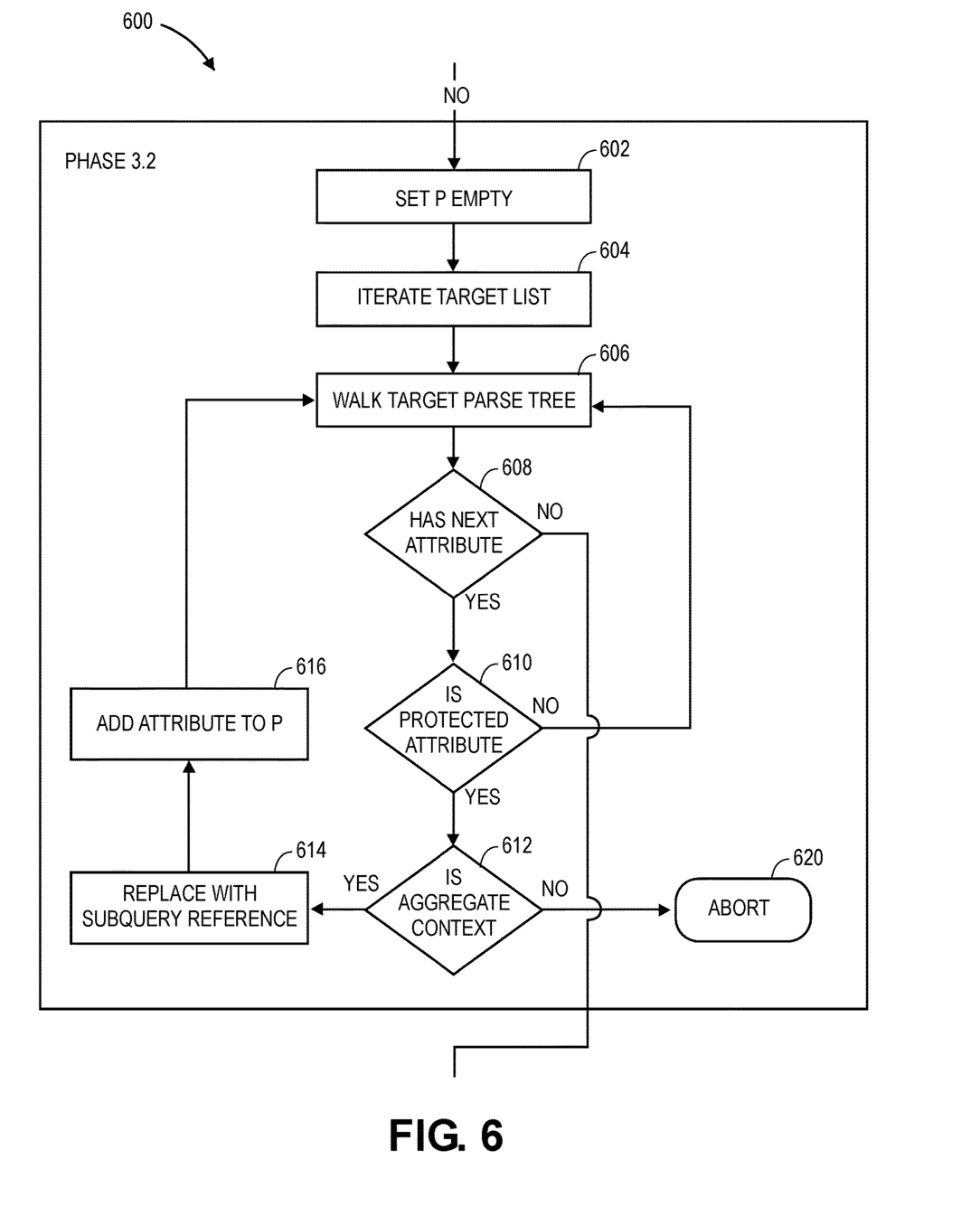
FIG. 6 is a flowchart of an example of a process of Phase 3.2 in accordance with aspects of the present disclosure.
Figure 7:
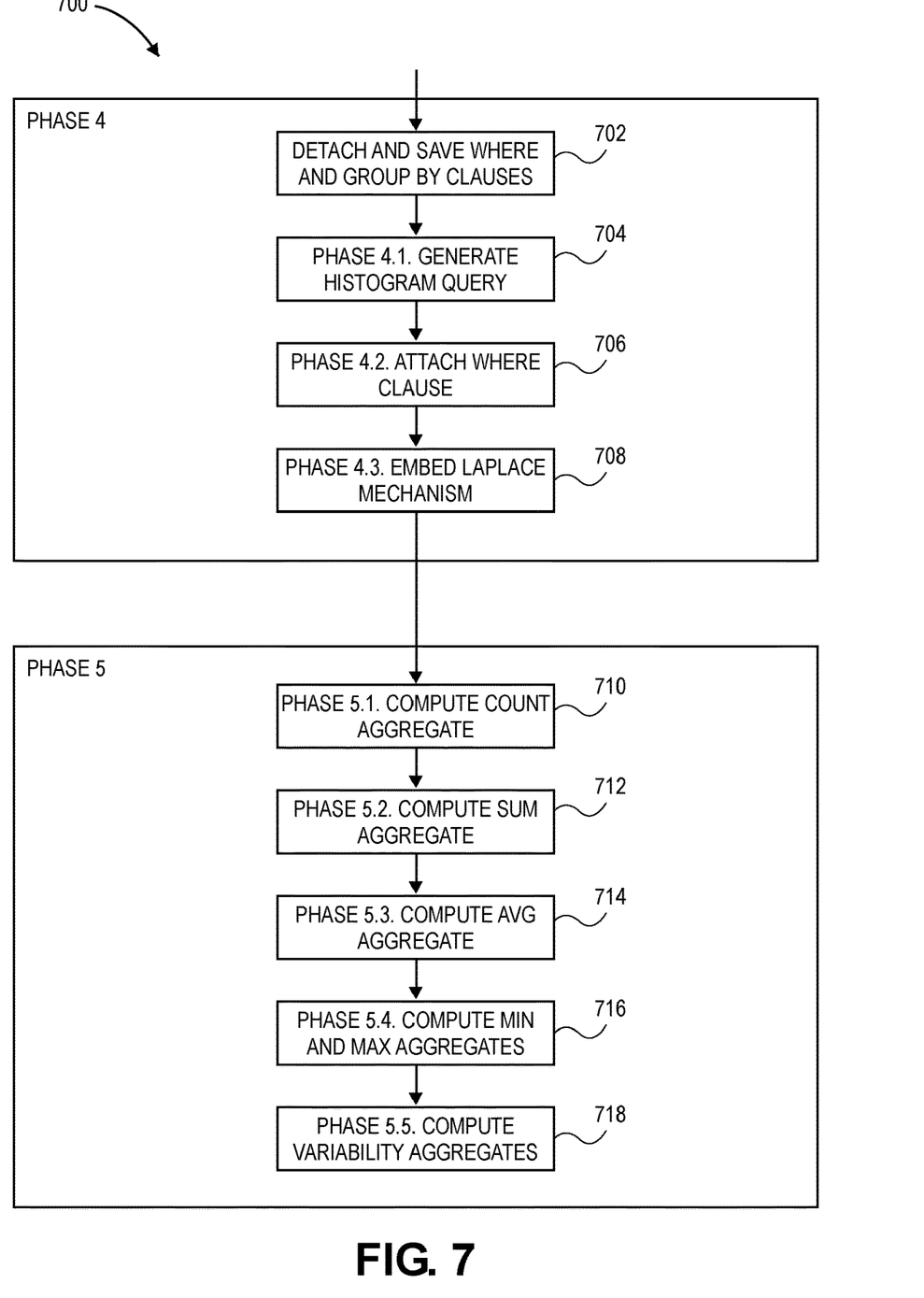
FIG. 7 is a flowchart of an example of a process of Phases 4 and 5 in accordance with aspects of the present disclosure.

Thus, assuming access to such a table, queries such as:
SELECT Occupation, COUNT(Salary), SUM(Salary)
FROM Salaries WHERE Sex='F'
GROUP BY Occupation
can be rewritten by the system as:
WITH Q AS ( . . . )
    SELECT Occupation, Q.CountSalary, Q.SumSalary
        FROM Q, FIG. 5-7 are flowcharts illustrating steps carried out by phases 3.1, 3.2, 4 and 5 as described in detail herein. In FIG. 5, in block 502, it is determined whether the received item is a Select statement. In block 506, the range list of the Select statement is iterated to begin building an associative map.

In block 508, it is determined if current range in the iteration is a subquery, and if so, the process recurses in block 510 to translate the subquery. If the item is not a subquery, it is determined in block 512 whether the current range is a table. If not, the process is aborted in block 504. If there is a table, in block 514, the process notes range identifier association with range for the table. In block 516, the process determines whether there is a next range, and if so, returns to block 506.

In FIG. 5, when block 516 determines there is no next range, execution proceeds to block 602 in FIG. 6, which initializes the set of encountered protected attributes, P, to empty. In block 604, processing proceeds by iterating over the target list of S. Then, in blocks 606-616, processing continues for each target by walking its parse tree looking for protected attributes and ensuring that whenever they appear, they appear inside of an aggregation operation, adding them to the set P, and replacing them with a reference to their evaluation from the noisy histogram. When there are not next attributes, the process moves to Phase 4 in FIG. 7.

In Phase 4 illustrated in FIG. 7, in block 702, if a parse tree contains a WHERE or GROUP BY clauses, the WHERE and/or GROUP BY clauses are detached and saved. In block 704, a histogram query is generated, which includes the steps previously mentioned in conjunction with Phase 4.1. In block 706, WHERE clauses are attached to the filtered histogram query as previously described. In block 708, the Laplace mechanism is embedded in the query to add Laplace noise.

In Phase 5 illustrated in FIG. 7, in block 710, an aggregate COUNT is computed by counting aggregates that are computed by summing histogram bin counts. In block 712, a SUM aggregate is computed by summing all numerical histogram bin counts weighted by the location of the bin center. In block 714, the average aggregate, AVG is computed, that can include averaging aggregates that combine the computed SUM and COUNT aggregates. In block 716, MIN and MAX aggregates are computed or estimated as previously described. In block 718 variability aggregates are computed as previously described.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for translating a SQL query into a SQL query incorporating a privacy mechanism, the system comprising:
    a computer-readable data storage device containing program instructions; and
    a processor, operably connected to the computer-readable data storage device, that executes the program instructions to perform operations comprising:
        obtaining the SQL query;
        translating the SQL query into a modified SQL query incorporating a histogram-based privacy mechanism configured to achieve differential privacy, wherein the translating comprises:
            parsing the SQL query;
            recursively translating the parsed SQL into an intermediate SQL query; and
            incorporating the histogram-based privacy mechanism into the intermediate SQL query to produce the modified SQL query, wherein the histogram-based privacy mechanism utilizes a histogram to add noise to results produced by the modified SQL query; and
        outputting the modified SQL query to a SQL database.

2. The system of claim 1, wherein the privacy mechanism is configured to perform binning of data referred to in the SQL query by placing counts of the data in a plurality of bins.

3. The system of claim 2, wherein the privacy mechanism is configured to add noise to data in at least one of the bins.

4. The system of claim 3, wherein the query is modified to produce estimates of aggregate functions of data referred to in the SQL query from the histogram.

5. The system of claim 1, wherein recursively translating the parsed SQL query comprises replacing at least one aggregate function with an SQL expression over a noisy histogram.

6. The system of claim 5, wherein the SQL expression replacing the aggregate function utilizes the noisy histogram to approximate evaluation of the replaced aggregate function.

7. A method of translating a SQL query into a SQL query incorporating a privacy mechanism, comprising:
    obtaining the SQL query;
    translating the SQL query into a modified SQL query incorporating a histogram-based privacy mechanism configured to achieve differential privacy, wherein the translating comprises:
        parsing the SQL query;
        recursively translating the parsed SQL into an intermediate SQL query; and
        incorporating the histogram-based privacy mechanism into the intermediate SQL query to produce the modified SQL query, wherein the histogram-based privacy mechanism utilizes a histogram to add noise to results produced by the modified SQL query; and
    outputting the modified SQL query to a SQL database.

8. The method of claim 7, wherein the privacy mechanism is configured to perform binning of data referred to in the SQL query by placing counts of the data in a plurality of bins.

9. The method of claim 8, wherein the privacy mechanism is configured to add noise to data in at least one of the bins.

10. The method of claim 7, wherein the query is modified to produce estimates of aggregate functions of data referred to in the SQL query from the histogram.

11. The method of claim 7, wherein recursively translating the parsed SQL query comprises replacing at least one aggregate function with an SQL expression over a noisy histogram.

12. The method of claim 11, wherein the SQL expression replacing the aggregate function utilizes the noisy histogram to approximate evaluation of the replaced aggregate function.

* * * * *